Aug. 13, 1935.  C. G. SUITS  2,011,380

ELECTRICAL SYSTEM PROVIDING SEQUENCE OPERATION

Filed Dec. 23, 1931

Inventor:
Chauncey G. Suits,
by
His Attorney.

Patented Aug. 13, 1935

2,011,380

UNITED STATES PATENT OFFICE 2,011,380

ELECTRICAL SYSTEM PROVIDING SEQUENCE OPERATION

Chauncey G. Suits, Schenectady, N. Y., assignor to General Electric Company, a corporation of New York Application December 23, 1931, Serial No. 582,801

5 Claims. (Cl. 177—346)

My invention relates to electrical systems containing a plurality of units which operate in a definite sequence. More particularly it relates to an electrical system comprising a series of lamps which are operated successively either to become illuminated or extinguished in a predetermined sequence.

It is the object of my invention to provide an improved system of this character whose construction is simple and inexpensive to manufacture and whose operation is not dependent upon any relative movement of cooperating parts.

My invention will be better understood from the following description taken in connection with the accompanying drawing, and its scope will be pointed out in the appended claims.

Figure 1:
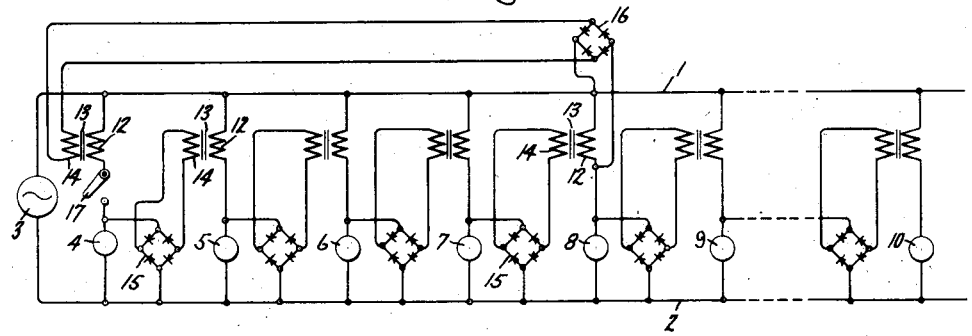
Figure 2:
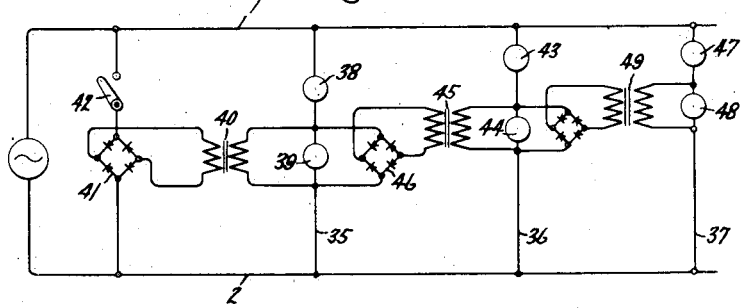
Figure 3:
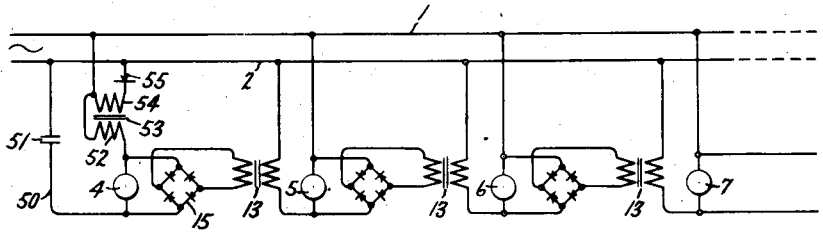
Figure 4:
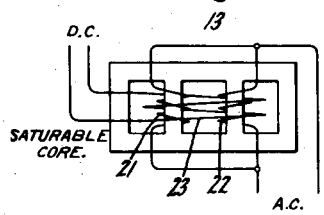
Figure 5:
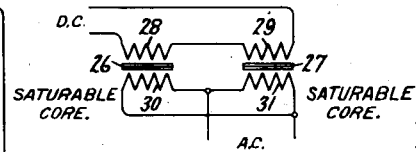

Referring to the drawing, Fig. 1 is a circuit diagram of one embodiment of my invention; Figs. 2 and 3 are circuit diagrams illustrating two modified forms thereof; and Figs. 4 and 5 illustrate two forms of saturable core reactor which may be used in the apparatus illustrated in Figs. 1, 2 and 3.

In Fig. 1 an alternating current supply circuit is shown at 1 and 2 which may be connected with any suitable source of alternating current illustrated at 3, which for example, may be a 110 volt, 60 cycle source. Connected across the supply circuit 1 and 2 is a series of branch circuits each containing a load device, such as an incandescent lamp, represented by 4, 5, 6, 7, 8, 9, 10. Such loads may, for example, be beacon or field border lamps at an airport, the lamps of an electric sign or any other loads which it is desired to have operate in a certain sequence. In each branch of the circuit and in series with the load device or lamp therein is the alternating current winding 12 of a saturable core reactor 13 having a direct current saturating winding 14. The winding 14 of each of these reactors is, with the exception of the reactor in the first branch circuit, shown connected across the lamp of the preceding branch through a full wave rectifier of well known construction represented at 15. The direct current winding 14 of the reactor in the first branch circuit is connected through the full wave rectifier 16 across the alternating current winding 12 of the rectifier in one of the branch circuits, for example, that containing lamp 8. This rectifier 16 may be connected across the reactor in any other branch circuit depending upon the frequency of operation which it is desired the lamps shall have. It will be noted that the several branch circuits containing lamps 4 to 10 inclusive are all of similar construction with the exception of the first circuit which, in addition to the apparatus in each of the other circuits, contains a control switch 17.

For the sake of simplicity I have shown the saturable core reactors 13 in a purely diagrammatic manner in Fig. 1. Their actual construction may, for example, be as shown in Fig. 4 where the core of reactor 13 has four legs, the winding 12 of which comprises the coils 21 and 22 wound in opposite directions on the two inner legs of the core and connected in parallel in the alternating current branch circuit and the saturating winding 14 of which comprises the single coil 23 which surrounds both of said legs. A reactor of this type is disclosed in the Alexanderson Patent No. 1,328,610 of January 20, 1920. Instead of a single core reactor I may employ two separate transformers 26 and 27 as shown diagrammatically in Fig. 5. These transformers respectively have saturating windings 28 and 29 which are shown connected in series and alternating current windings 30 and 31 shown connected in parallel. Windings 30 and 31 are shown reversed in order to prevent alternating current from being induced in the direct current circuit.

When the control switch 17 is open the lamp 4 not only is dark but each of the other lamps also is dark for the reason that, in the unsaturated condition, the inductance of the alternating current winding 12 of each reactor, with the exception of the reactor controlling the lamp 4, is too high to permit sufficient current to pass for the illumination of the lamp in series therewith. Since the impedance of the winding 12 in series with lamp 8 is high, the direct current supplied by the rectifier 16 to the reactor 13 connected with the first branch circuit is sufficiently large to saturate the core of that reactor, which in accordance with the characteristics of saturable core reactors, decreases the inductance of its alternating current winding. Hence when switch 17 is closed, lamp 4 becomes illuminated. The potential drop across lamp 4 now causes a saturating current to be supplied through the rectifier 15 connected therewith to the saturating winding 14 of the reactor in circuit with lamp 5. The resulting saturation of this reactor reduces the impedance of its winding 12 to such an extent that lamp 5 becomes illuminated. The impedance of winding 12 of this reactor does not change instantaneously but inherently experiences a time delay which is fundamentally due to the relatively long time constant of the closed winding which characterizes reactors of this type. Hence lamp 5 is illuminated an appreciable time after the illumination of lamp 4. In a similar manner the increased potential difference across lamp 5 due to its illumination operates to cause the subsequent illumination of lamp 6 and so on throughout the whole series, each successive lamp becoming illuminated after the illumination of the previous lamp. This time delay in the operation of the successive lamps is due in part to the time constant of the successive saturable core reactors and in part to the characteristics of the successive lamps since the rectifiers are not energized until the voltage rises across the lamp associated therewith, which in turn does not occur until the filament has attained a high temperature.

When lamp 8 of the series is illuminated the impedance of the reactor winding 12 in series therewith is relatively low and the resulting current supplied through rectifier 16 to the reactor in series with lamp 4 is too low to produce saturation. Hence the impedance of the reactor in circuit with lamp 4 increases and extinguishes that lamp. The extinguishing of lamp 4 likewise restores the reactor in circuit with lamp 5 to its original condition of non-saturation whereby lamp 5 is extinguished, and so on throughout the entire series. When the circuit of lamp 8 is reached, however, the increased impedance of that branch reacts on the first branch to cause the illumination of lamp 4. Thus it will be seen that the illumination of the several lamps of the series travels in waves throughout the entire length of the series and the length of each wave is governed by the number of branch circuits between those which are interconnected by rectifier 16.

In addition to the use of apparatus such as I have shown and described for the operation of airport beacons, field border lights, electric signs, etc. as mentioned above, the apparatus may be employed to advantage to mark the runways in airports in accordance with the wind direction and to control the speed of traffic in congested places, such as in tunnels. For this application, the light impulse may be caused to travel the length of the tunnel at a speed which is considered desirable for the traffic to maintain, thus it would comprise a traffic monitoring system. Various other uses of my invention in the field of traffic control and railroad crossing protection naturally suggest themselves but which need not be described in this application. One of the important advantages of my invention is that the various load or lamp circuits are controlled automatically without the use of apparatus having any moving parts which are subject to friction and wear. Moreover, being without any moving contacts where sparking might occur there is complete absence of radio interference.

In certain cases I may prefer to omit the reactor in the first branch circuit or that containing lamp 4 so that upon each closure of the switch 17 the wave of light will progress the full length of the series as before but all the lamps will remain illuminated until the switch is opened. In this manner signals may be sent to airplanes from the ground. For example, suppose 20 or 30 lamps comprise such a series and each time a key is depressed a wave of illumination is started at one end of the series. The number of lamps illuminated then will depend upon the length of time that the key is depressed. If the depressed time is say ¼ of a second the light wave may consist of two or three lamps which may correspond with a dot in the Morse code. If the key is held depressed for a full second, the traveling light wave may consist of ten lamps. Thus information may be transmitted by code in the manner somewhat analogous to the method employed in certain well known advertising signs.

In the modified form of my invention illustrated by Fig. 2, the several branch circuits 35, 36 and 37 each contains a plurality of lamps, the apparatus being such that the lamps in each branch are lighted and extinguished alternately; also the corresponding lamps of the several branches are lighted and extinguished alternately, a wave of illumination being caused to progress down the series as in the preceding arrangement. Branch 35 contains lamp 38 and lamp 39. Connected across lamp 39 is the alternating current winding of the saturable core reactor 40. The direct current saturating winding of this reactor receives current from the rectifier 41 which is connected across the supply circuit 1 and 2 and is controlled by the switch 42. In branch circuit 36 are lamps 43 and 44 across the latter of which is connected the alternating current winding of reactor 45. The saturating winding of this reactor connects through the rectifier 46 across lamp 39 of the previous branch circuit. Similarly branch 37 contains lamps 47 and 48, the latter being connected through the saturable core reactor 49 and a rectifier with lamp 44 in branch 36. Lamps 38, 43, and 47 have a somewhat lower resistance than lamps 39, 44, and 48.

With the arrangement shown in Fig. 2, when switch 42 is open lamps 38, 44 and 47 will be dark, while lamps 39, 43 and 48 will be illuminated. The reason for this will be readily understood when it is considered that since reactor 40 is unsaturated the impedance of its alternating current winding is high which increases the total impedance of the branch circuit 35 so that lamp 38 is dark but lamp 39 being shunted by the high impedance is illuminated. It will also be seen that since lamp 39 is illuminated a saturating current is supplied to reactor 45 which in turn lowers the impedance of its alternating current winding shunted across lamp 44. Hence the total impedance of branch 36 is low causing lamp 43 to be illuminated but lamp 44 to be dark because of the low impedance shunt. Likewise in branch 37 the total impedance is high as in branch 35, whence lamp 47 is dark, but lamp 48 is illuminated because of the high impedance of the winding shunted about it.

When switch 42 is closed reactor 40 becomes saturated decreasing the impedance of its alternating current winding and accordingly decreasing the total impedance of branch 35 whence lamp 38 becomes illuminated but lamp 39 because of the lower impedance in shunt therewith becomes dark. Reactor 45 now becomes unsaturated and the impedance of its alternating current winding increases to cause lamp 43 to become dark but lamp 44 to be illuminated. Following through to branch 37 we find lamp 47 now is illuminated while lamp 48 becomes dark. This series while shown as containing but three branch circuits may like the arrangement shown in Fig. 1 be extended on indefinitely the wave of illumination progressing down the series whenever the switch 42 is closed or opened.

The modified form of my invention illustrated by Fig. 3 is similar to that shown in Fig. 1 with the exception that the frequency of the successive illuminations of each lamp is governed by the operation of a non-linear pulsating circuit. As in Fig. 1, several branch circuits are shown containing respectively load devices or lamps 5, 6, 7, etc. and saturable core reactors 13 each connected through a rectifier 15 with the lamp in the preceding branch. Since these circuits are constructed to operate successively in the manner already described above in connection with Fig. 1, they will not be described again in detail. For initiating the operation of the first load device or lamp 4, I have provided the non-linear pulsating circuit 50 which includes in addition to lamp 4 the capacitor 51 and the alternating current winding 52 of the saturable core reactor 53. The saturating winding 54 of this reactor may be energized from any suitable source but I prefer to energize it from a connection with the supply circuit 1 and 2 through the rectifier 55. This circuit has been described and claimed in my Patent 1,921,787, August 8, 1933, and assigned to the same assignee as this application. The inductance, capacitance and resistance in circuit 50 are so related that with a proper voltage and frequency of the supply circuit the current in the circuit alternately increases and decreases with a frequency which is materially less than the frequency of the alternating current supply. The pulsations of the alternating current in circuit 50 may, for example, when 60 cycle current is supplied, range from ten per second to one in many seconds. It will be noted that this circuit is purely electrical in character being entirely devoid of any moving parts. The pulsations of the alternating current flowing in circuit 50 cause the alternate illumination and darkening of lamp 4 therein. Hence the saturating current supplied to the reactor 13 in circuit with lamp 5 is caused to vary to alternately saturate and unsaturate the core of this reactor. The impulses having been started by the non-linear circuit 50, the arrangement disclosed by Fig. 3 functions in a manner similar to that already described above in connection with Fig. 1, the wave of illumination being caused to travel down the series which as in Fig. 1 may be of indefinite length.

It will be noted that in Fig. 1 the lamps of the series beyond lamp 8 require the use of but one conductor in addition to the two conductors of the supply circuit. Likewise in Fig. 3 all lamps of the series beyond the first require the use of but a single conductor in addition to the supply circuit.

I have chosen the particular embodiments described above as illustrative of my invention and it will be apparent that various other modifications may be made without departing from the spirit and scope of my invention, which modifications I aim to cover by the appended claims.

What I claim as new and desire to secure by Letters Patent of the United States, is:

1. A sequence light operating system comprising an alternating current supply circuit, a plurality of branch circuits connected therewith each containing a lamp, means for controlling the current supplied to one of said lamps, a saturable core reactor having a load winding in circuit with another of said lamps and having a control winding and a rectifier connected across said one lamp for supplying rectified current to said control winding.

2. A system for producing a sequence operation of a plurality of load devices comprising an alternating current supply circuit, a plurality of branch circuits connected therewith each including one of said load devices and the reactive winding of a saturable core reactor, means for controlling the saturation of the reactor in one of said branch circuits and means comprising a rectifier and a saturating winding connected therewith responsive to the energization of the load device in said one circuit for controlling the saturation of the reactor in another of said branch circuits.

3. A system for producing a sequence operation of a plurality of lamps comprising an alternating current supply circuit, a plurality of branch circuits connected therewith each including one of said lamps and the reactive winding of a saturable core reactor, means for saturating the reactor in one of said branch circuits and means responsive to the energization of the lamp in said one circuit for saturating the reactor in another of said branch circuits.

4. A system for producing a sequence operation of a plurality of similar load devices comprising an alternating current supply circuit, a plurality of branch circuits connected therewith each including one of said load devices and the reactive winding of a saturable core reactor, means responsive to the energization of the load device in one branch circuit for controlling the saturation of the reactor in another branch circuit and means responsive to a change in the impedance of the reactor in said other branch circuit for controlling the saturation of the reactor in said one branch circuit.

5. A system for producing a continuous sequence operation of a series of load devices comprising an alternating current supply circuit, a series of branch circuits connected therewith each including one of said load devices and the reactive winding of a saturable core reactor, means responsive to the energization of each load device of said series except the last for controlling the saturation of the reactor in the next following branch circuit and means responsive to a change in impedance of the reactor in said last branch circuit for controlling the saturation of the reactor in the first branch circuit of the series.

CHAUNCEY G. SUITS.